United States Patent [19]

Courtois et al.

[11] Patent Number: 5,513,729
[45] Date of Patent: May 7, 1996

[54] VEHICLE TRANSMISSIONS EQUIPPED WITH EDDY CURRENT RETARDERS, AND IN FASTENER MEMBERS FOR SUCH TRANSMISSIONS

[75] Inventors: Jean-Claude Courtois, Vigny; Jean-Yves Disson, Champagne Au Mont D'Or, both of France

[73] Assignee: Labavia SGE, Le Bretonneux, France

[21] Appl. No.: 461,738

[22] Filed: Jun. 5, 1995

[30] Foreign Application Priority Data

Jun. 8, 1994 [FR] France .................. 94 07016

[51] Int. Cl.⁶ .................................. H02K 49/02
[52] U.S. Cl. ............... 188/164; 74/606 R; 188/158; 310/105
[58] Field of Search ................ 188/164, 158, 188/163, 161, 159, 267, 18 R; 310/93, 105; 74/606 R; 192/21.5

[56] References Cited

U.S. PATENT DOCUMENTS

| | | | |
|---|---|---|---|
| 3,450,238 | 6/1969 | Adkins | 188/164 |
| 3,908,141 | 9/1975 | Lemonnier | 310/105 |
| 4,128,147 | 12/1978 | Ruberte | 188/164 |
| 4,309,633 | 1/1982 | Marandet | 310/105 |
| 4,491,755 | 1/1985 | Bertrand | 188/18 R |
| 4,791,330 | 1/1985 | Charbonnier et al. | |
| 5,044,227 | 9/1991 | Rugraff | 310/105 |
| 5,064,029 | 11/1991 | Araki et al. | 188/164 |
| 5,219,050 | 6/1993 | Kubomiya | 188/164 |

FOREIGN PATENT DOCUMENTS

| | | |
|---|---|---|
| 2610878 | 8/1988 | France . |
| 2122035 | 1/1984 | United Kingdom . |

*Primary Examiner*—Douglas C. Butler
*Attorney, Agent, or Firm*—Larson and Taylor

[57] ABSTRACT

The invention relates to a vehicle transmission including an eddy current retarder, the stator of which is fastened to the housing of a gearbox by fastener members and the rotor of which is connected to the gearbox outlet shaft. According to the invention, the fastener members include at least two rigid parts, one fastened to the stator and the other to the rotor, each of the two parts including a bearing surface which corresponds to at least part of a surface of revolution centered on the gearbox outlet shaft, the two bearing surfaces being separated by a layer of an elastomeric material which is bonded to the two bearing surfaces and which allows a certain relative angular displacement of the two rigid parts, the two rigid parts being unmovable relative to one another in a direction parallel to the width of the air gap which separates the rotor and the stator.

10 Claims, 2 Drawing Sheets

VEHICLE TRANSMISSIONS EQUIPPED WITH EDDY CURRENT RETARDERS, AND IN FASTENER MEMBERS FOR SUCH TRANSMISSIONS

FIELD OF THE-INVENTION

The present invention relates to transmissions for vehicles, in particular heavy trucks, the transmissions including respective eddy current retarders. The invention also relates to fastener members for such transmissions.

More particularly, the invention concerns a vehicle transmission including a gearbox which can be coupled to an internal combustion engine and which has a housing and an outlet shaft, and an eddy current retarder which is equipped with a stator and a rotor, the stator being fastened to the gearbox housing by fastener means including at least one fastener member, and the rotor being connected to the gearbox outlet shaft, one of the stator and the rotor including a ring of electromagnetic poles centered on the gearbox outlet shaft and the other including at least one annular element of magnetic material which is also centered on the gearbox outlet shaft, the poles and the annular element being separated by an air gap of small width.

BACKGROUND OF THE INVENTION

In a vehicle transmission of this type, the gearbox housing transmits vibration to the stator of the retarder, this vibration being generated by the internal combustion engine of the vehicle. In particular, this vibration includes torsional vibration about the gearbox outlet shaft, which vibration is generated by the successive firings which take place within the engine.

This torsional vibration causes fatigue in the fastener members, which is compensated for in the prior art by oversizing the fastener members.

However, such oversizing leads to an undesirable increase in the weight of the vehicle, and also, it is never certain whether the amount of oversizing is sufficient in view of the ever-increasing power of internal combustion engines.

OBJECTS AND SUMMARY OF THE INVENTION

A particular object of the present invention is to resolve this technical problem.

To this end, according to the invention, in a vehicle transmission of the type in question, the fastener member includes two rigid parts fastened rigidly respectively to the stator of the retarder and to the gearbox housing, each of these two parts including a bearing surface which corresponds to at least part of a surface of revolution centered about the gearbox outlet shaft, the two bearing surfaces being arranged opposite one another and being separated by a layer of an elastomeric material, this layer of elastomeric material being bonded to the two bearing surfaces to allow a certain amount of angular deflection of the two rigid parts relative to one another in rotation about the gearbox outlet shaft, the two rigid parts being substantially unmovable relative to one another in a direction parallel to the width of the air gap.

In preferred embodiments, one or more of the following arrangements may be used:

- one of the two bearing surfaces is in the shape of a groove which opens radially, whereas the other is a projecting portion of shape substantially complementary to that of the groove, which penetrates radially into said groove, the fastener means being angularly distributed around the gearbox outlet shaft, and the layer of elastomeric material interposed between the groove and the projecting portion being, at least in a direction parallel to the width of the air gap, of a sufficiently small thickness as to prevent substantially any relative displacement of the two rigid parts relative to one another in said direction parallel to the width of the air gap;
- the thickness of the layer of elastomeric material lies in the range 1 mm to 3 mm;
- the width of the air gap extends axially and the elastomeric material is arranged at least axially on either side of the projecting portion which penetrates into the groove;
- the groove has a substantially channel-shaped cross-section with a base, and the elastomeric material is also arranged radially between the projecting portion and the base of the channel-section groove; thus, predetermined mounting stiffness can be chosen in each of the axial, radial and circumferential directions;
- the elastomeric material is a silicone;
- the fastener means include a plurality of fastener members angularly distributed about the gearbox outlet shaft, the bearing surfaces of each fastener member each extending angularly over a curvilinear length lying in the range 50 mm to 100 mm;
- the fastener means include a plurality of fastener members, at least one fastener member having a stop which is integral with one of its two rigid parts and which is intended to butt against the other of its two rigid parts to limit the angular deflection of the stator relative to the gearbox housing in a first angular direction, and at least one fastener member having a stop which is integral with one of its two rigid parts and which is intended to butt against the other of its two rigid parts to limit the angular deflection of the stator relative to the gearbox housing in a second angular direction; and
- a portion of the layer of elastomeric material is interposed with a certain clearance between the stop and the rigid part which co-operates with said stop.

Moreover, the invention also provides a fastener member for mounting a stator of an eddy current retarder onto a housing of a gearbox in a vehicle transmission such as defined above, the fastener member including two rigid parts each having attachment means for rigidly fastening said parts onto the stator of the retarder and onto the gearbox housing respectively, each of these two parts including a bearing surface which corresponds to at least part of a surface of revolution centered about the gearbox outlet shaft when the stator is mounted on the housing by means of the fastener member, the two bearing surfaces being arranged opposite one another and being separated by a layer of an elastomeric material, one of the two bearing surfaces being in the shape of a groove which opens radially inwardly, whereas the other is a projecting portion of shape substantially complementary to that of the groove, which penetrates radially into said groove, the layer of elastomeric material being arranged axially on either side of the projecting portion and radially between the projecting portion and the groove, and that layer has a thickness lying in the range 1 mm to 3 mm.

BRIEF DESCRIPTION OF THE DRAWINGS

Other features and advantages of the invention become apparent from the following description of an embodiment thereof, given by way of non-limiting example, and with reference to the accompanying drawings.

In the drawings.

MORE DETAILED DESCRIPTION

Figure 1:
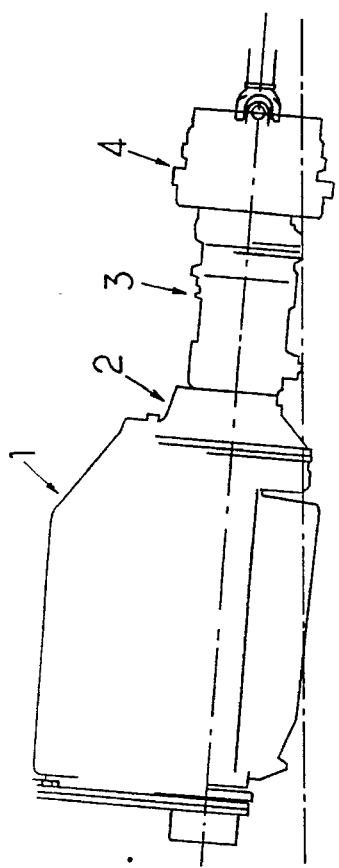
FIG. 1 is a schematic representation of a motive power unit for a heavy truck.

The motive power unit shown schematically in FIG. 1 comprises, in a single assembly, an engine 1, a clutch 2, a gearbox 3 and an eddy current retarder 4; the gearbox 3 may be coupled to the engine 1 via the clutch 2 and the retarder 4 is permanently coupled to the outlet shaft of the gearbox 3.

Figure 2:
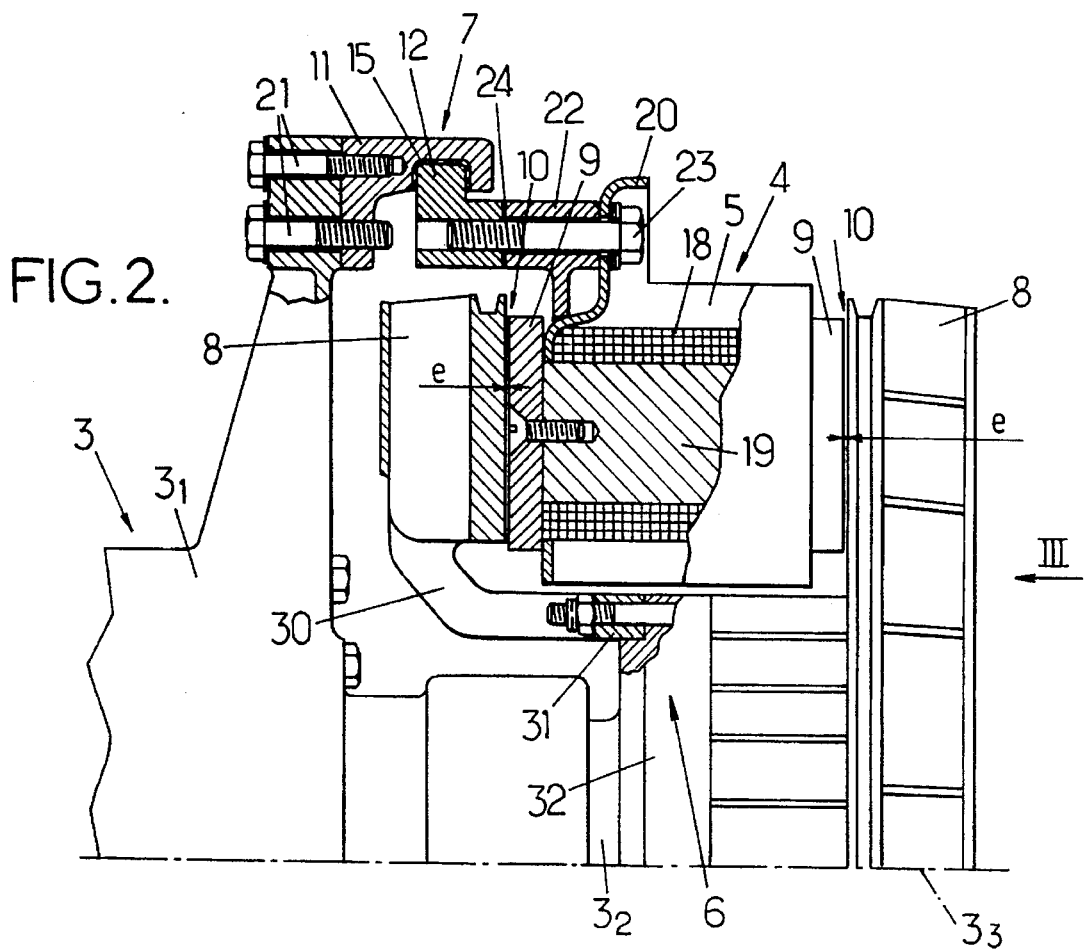
FIG. 2 is a partial axial section view of an eddy current retarder mounted on the housing of the gearbox of the motive power unit of FIG. 1.

The mounting of the retarder 4 on the gearbox 3 is shown in more detail in FIG. 2. The retarder includes a stator 5 which is fastened to the gearbox housing $3_1$ and a rotor 6 which is rigidly fastened to the gearbox outlet shaft $3_2$ and which revolves with that outlet shaft about an axis of rotation $3_3$.

In the example shown, the rotor includes two radially-extending disks 8 which are axially spaced apart from each other and which are connected radially inwardly to the gearbox outlet shaft $3_2$ via, in succession, two rings of blades 30 forming cooling fins and two annuluses 31 screwed onto an intermediate plate 32.

Facing each disk 8, the stator 5 includes a ring of electromagnetic poles 9. Within each ring, the poles 9 are alternately north and south in type, and they are separated from the disk 8 which faces the ring by a radially-extending air gap 10 of very small axial width e, generally lying in the range 1 mm to 3 mm, and frequently being about 1.5 mm. The width of the air gap may vary during operation of the retarder, due to play in the mounting of the gearbox outlet shaft 32 and to thermal expansion.

The poles 9 of the two rings of poles are connected in pairs, each pair of poles being magnetized by a coil 18 when that coil is energized by an electric current.

Each coil 18 surrounds a core 19 of ferromagnetic material which extends axially between the poles 9 of a pair of poles. Moreover, the poles 9 may simply be constituted by the axial ends of the cores 19.

The poles 9, the coils 18 and the cores 19 of the stator are integral with a flange 20, generally of a nonmagnetic material, which is itself fastened to the gearbox housing $3_1$ via fastener members 7, angularly distributed about the retarder.

Figure 3:
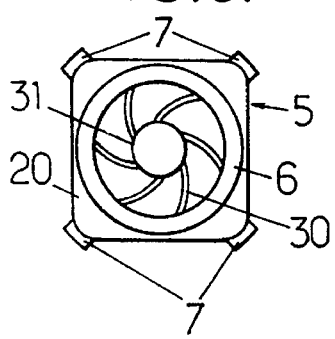
FIG. 3 is a schematic elevation view as seen in direction III of FIG. 2.

As can be seen in FIG. 3, there may be four such fastener members 7 which are arranged at the four corners of the flange 20 of the stator if the stator is substantially square in shape.

Figure 4:
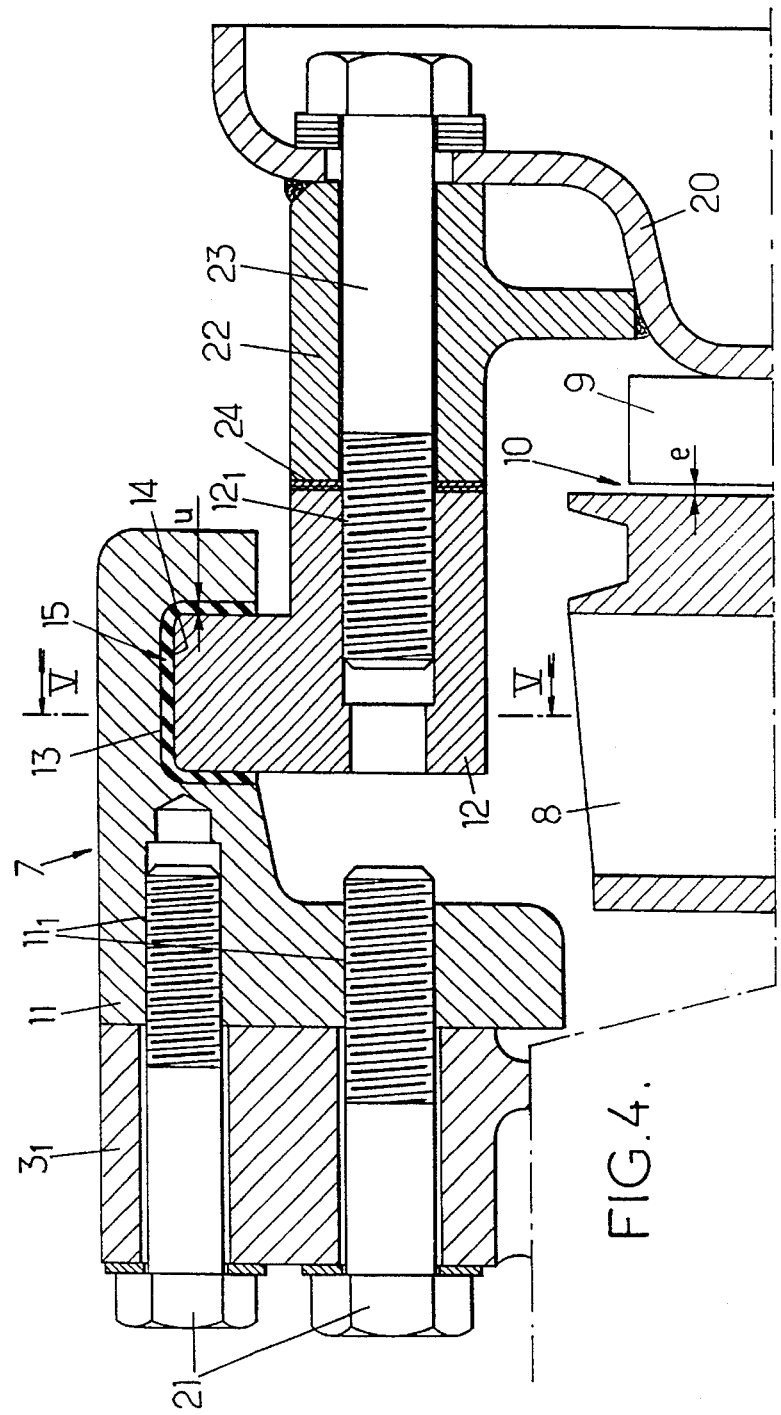
FIG. 4 is a detail view of part of FIG. 2.

As shown in more detail in FIG. 4, each fastener member 7 includes two rigid metal parts 11, 12 which are rigidly fastened to the gearbox housing and to the flange 20 of the stator of the retarder respectively.

The first rigid part 11 includes threaded holes $11_1$ which receive screws 21 allowing said first part 11 to be fastened to the gearbox housing.

The first part 11 also includes a groove 13 which opens radially inwardly and which corresponds to part of a surface of revolution centered on the axis of rotation $3_3$. In the example shown, this groove 13 has a channel-shaped cross-section with a substantially rectilinear base and two sides which are also substantially rectilinear.

The second rigid part 12 is also pierced with threaded holes $12_1$ which allow said part 12 to be fastened to the flange 20 of the stator, by means of an intermediate part 22 through which there pass screws 23 which engage in the threaded holes $12_1$. In addition, rigid adjusting shims 24 are generally interposed between the intermediate part 22 and the rigid part 12.

The rigid part 12 includes a protruding portion 14 directed radially outwardly, substantially complementary in shape to the groove 13, the protruding portion 14 being, however, separated from the base and the two sides of the groove 13 by a space which is filled with a thin layer 15 of an elastomeric material, preferably a silicone. This thin layer is preferably continuous, but may possibly be discontinuous.

The layer of elastomeric material has a small thickness u of the order of 1 mm to 3 mm, for example about 2 mm. This thickness may possibly be different along the sides and the base of the channel-section groove, so as to control mounting stiffness in both the axial and the radial directions. Moreover, the mounting stiffness in the circumferential direction may also be controlled by the curvilinear length of the groove 13.

Figure 5:
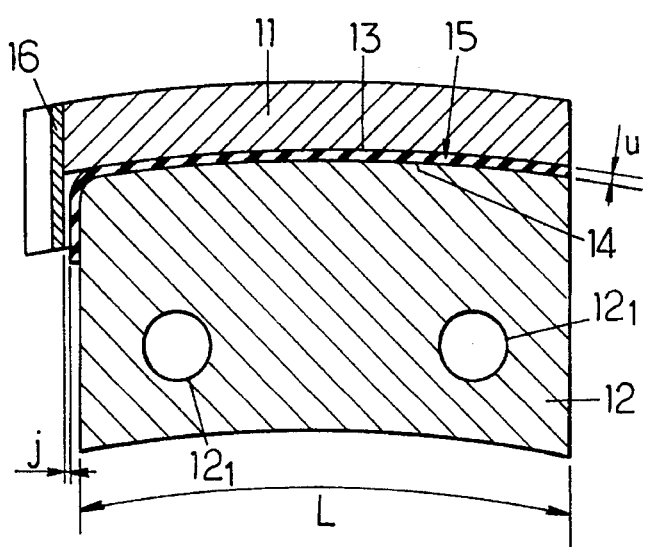
FIG. 5 is a section view on line V—V of FIG. 4.

As shown in FIG. 5, the groove 13 extends over the entire angular extent of the first part 11, over a curvilinear length L which may lie in the range 50 mm to 100 mm in the most usual cases, and which may for example be about 80 mm.

Thus, the second rigid part 12 can undergo angular displacement relative to the first rigid part 11, in rotation about the axis 33, causing the elastomeric layer 15 to act in shear.

For example, for an elastomeric layer of silicone that is 1 mm to 3 mm in thickness, relative angular displacements between the two parts of about 0.5 mm to 1.5 mm can readily be obtained.

By contrast, because of the small thickness of the elastomeric material, the displacement between the parts 11 and 12 in the axial and radial directions is very small. For example, still considering the case of an elastomeric layer 15 of silicone having a thickness of about 1 mm to 3 mm, it is possible to obtain relative axial and radial displacements between the parts 11 and 12 which are limited to 0.02 mm. In this way, there is no danger of reducing the width of one of the air gaps 10 to a value which would run the risk of no longer guaranteeing no contact between the rotor and the stator.

By way of a preferred but not essential improvement, it is possible to fasten a metal stop 16 onto the first rigid part 11 of at least one fastener member 7, which stop may for example be welded to the first rigid part 11. This stop 16 may be arranged at an angular end of the groove 13, so as to limit the relative angular displacement of the second rigid part 12 with respect to the first rigid part 11 in a predetermined angular direction, when the second rigid part contacts the stop 16.

Advantageously, the elastomeric layer 15 extends around that side of the second rigid part 12 which faces the stop 16, so as to absorb the impacts between the stop 16 and the second rigid part 12, particularly in the case where the elastomeric material has worn. A clearance j of about 0.5 mm is therefore provided between this extension of the elastomeric layer 15 and the stop 16.

An identical stop 16 is provided in the opposite angular direction, on at least one other fastener member 7, or possibly on the same fastener member 7.

The present invention is not limited to the particular embodiment which has just been described, but on the contrary embraces all the variants on the invention, particularly those in which:

the width of the air GaP is directed radially rather than axially, the stator of the retarder constitutes the secondary magnetic circuit whereas the rotor carries the field-inducing poles, the rotor of the retarder includes a number of ferromagnetic disks other than two, the different fastener members 7 are connected to one another to form a single functional assembly, the groove 13 of the fastener members opens radially outwardly and not inwardly, the groove 13 is formed in the rigid part which is fastened to the stator whereas the protruding portion 14 is formed on the rigid part which is fastened to the gearbox housing.

We claim:

1. A vehicle transmission, including a gearbox which can be coupled to an internal combustion engine and which has a housing and an outlet shaft, and an eddy current retarder which is equipped with a stator and a rotor, the stator being fastened to the gearbox housing by fastener means including at least one fastener member, and the rotor being connected to the gearbox outlet shaft, one of the stator and the rotor including a ring of electromagnetic poles centered on the gearbox outlet shaft and the other including at least one annular element of magnetic material which is also centered on the gearbox outlet shaft, the poles and the annular element being separated by an air gap of small width, wherein the fastener member includes two rigid parts fastened rigidly respectively to the stator of the retarder and to the gearbox housing, each of these two parts including a bearing surface which corresponds to at least part of a surface of revolution centered about the gearbox outlet shaft, the two bearing surfaces being arranged opposite one another and being separated by a layer of an elastomeric material, this layer of elastomeric material being bonded to the two bearing surfaces to allow a certain amount of angular deflection of the two rigid parts relative to one another in rotation about the gearbox outlet shaft, the two rigid parts being substantially unmovable relative to one another in a direction parallel to the width of the air gap.

2. A vehicle transmission according to claim 1, in which one of the two bearing surfaces is in the shape of a groove which opens radially, whereas the other is a projecting portion of shape substantially complementary to that of the groove, which penetrates radially into said groove, the fastener means being angularly distributed around the gearbox outlet shaft, and the layer of elastomeric material interposed between the groove and the projecting portion is, at least in a direction parallel to the width of the air gap, of a sufficiently small thickness as to prevent substantially any relative displacement of the two rigid parts relative to one another in said direction parallel to the width of the air gap.

3. A transmission according to claim 2, in which the thickness of the layer of elastomeric material lies in the range 1 mm to 3 mm.

4. A transmission according to claim 2, in which the width of the air gap extends axially and the elastomeric material is arranged at least axially on either side of the projecting portion which penetrates into the groove.

5. A transmission according to claim 4, in which the groove has a substantially channel-shaped cross-section with a base, and in which the elastomeric material is also arranged radially between the projecting portion and the base of the channel-section groove.

6. A transmission according to claim 1, in which the elastomeric material is a silicone.

7. A transmission according to claim 1, in which the fastener means include a plurality of fastener members angularly distributed about the gearbox outlet shaft, the bearing surfaces of each fastener member each extending angularly over a curvilinear length lying in the range 50 mm to 100 mm.

8. A transmission according to claim 1, in which the fastener means include a plurality of fastener members, at least one fastener member having a stop which is integral with one of its two rigid parts and which is intended to butt against the other of its two rigid parts to limit the angular deflection of the stator relative to the gearbox housing in a first angular direction, and at least one fastener member having a stop which is integral with one of its two rigid parts and which is intended to butt against the other of its two rigid parts to limit the angular deflection of the stator relative to the gearbox housing in a second angular direction.

9. A transmission according to claim 8, in which a portion of the layer of elastomeric material is interposed with a certain clearance between the stop and the rigid part which co-operates with said stop.

10. A fastener member for mounting a stator of an eddy current retarder onto a housing of a gearbox in a vehicle transmission, the fastener member including two rigid parts each having attachment means for rigidly fastening said parts onto the stator of the retarder and onto the gearbox housing respectively, each of these two parts including a bearing surface which corresponds to at least part of a surface of revolution centered about a gearbox outlet shaft when the stator is mounted on the housing by means of the fastener member, the two bearing surfaces being arranged opposite one another and being separated by a layer of an elastomeric material, one of the two bearing surfaces being in the shape of a groove which opens radially inwardly, whereas the other is a projecting portion of shape substantially complementary to that of the groove, which penetrates radially into said groove, the layer of elastomeric material being arranged axially on either side of the projecting portion and radially between the projecting portion and the groove, and this layer having a thickness lying in the range 1 mm to 3 mm.

* * * * *